(12) United States Patent
Lorenz (10) Patent No.: US 11,021,229 B2
(45) Date of Patent: Jun. 1, 2021

(54) WING FOR AN AIRCRAFT

(71) Applicant: Airbus Operations GmbH, Hamburg (DE)

(72) Inventor: Florian Lorenz, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 511 days.

(21) Appl. No.: 15/852,073

(22) Filed: Dec. 22, 2017

(65) Prior Publication Data
US 2018/0178900 A1    Jun. 28, 2018

(30) Foreign Application Priority Data

Dec. 22, 2016  (EP) ..................................... 16206500

(51) Int. Cl.
| | | |
|---|---|---|
| *B64C 3/50* | (2006.01) | |
| *B64C 13/34* | (2006.01) | |
| *B64C 9/22* | (2006.01) | |

(52) U.S. Cl.
CPC .................. *B64C 3/50* (2013.01); *B64C 9/22* (2013.01); *B64C 13/34* (2013.01)

(58) Field of Classification Search
CPC .... B64C 9/16; B64C 9/18; B64C 9/20; B64C 9/22; B64C 9/24; B64C 9/26; B64C 13/34; B64C 3/50; B64C 9/28
See application file for complete search history.

(56) References Cited

U.S. PATENT DOCUMENTS

| | | | | |
|---|---|---|---|---|
| 4,202,519 A | * | 5/1980 | Fletcher ..................... | B64C 9/24 244/210 |
| 4,470,569 A | * | 9/1984 | Shaffer ...................... | B64C 9/22 244/213 |
| 5,927,656 A | * | 7/1999 | Hinkleman ................ | B64C 9/24 244/203 |
| 8,534,610 B1 | * | 9/2013 | Pitt ............................ | B64C 9/22 244/214 |

(Continued)

FOREIGN PATENT DOCUMENTS

| | | | | |
|---|---|---|---|---|
| EP | 2669191 | | 12/2013 | |
| EP | 3241740 A1 | * | 11/2017 | ............... B64C 9/24 |

(Continued)

OTHER PUBLICATIONS

European Search Report, dated May 10, 2017, priority document.

*Primary Examiner* — Philip J Bonzell
(74) *Attorney, Agent, or Firm* — Greer, Burns & Crain, Ltd.

(57) ABSTRACT

A wing for an aircraft, comprising a main wing, a slat, and a connection assembly movably connecting the slat to the main wing, allowing the slat to be moved between a retracted and at least one extended position. The assembly comprises an elongate slat track mounted to the main wing movably along a track longitudinal axis and connected to the slat. The wing has a compact connection assembly that does not require the front spar to be penetrated, in that the slat track is rotatably connected to the slat via a first hinge. The assembly further comprises a link element rotatably connected to the slat via a second hinge, and rotatably mounted to the main wing via a third hinge spaced apart from the second hinge. Also, a first axis of rotation of the first hinge is spaced apart from a second axis of rotation of the second hinge.

15 Claims, 6 Drawing Sheets

(56) References Cited

U.S. PATENT DOCUMENTS

| | | | |
|---|---|---|---|
| 9,174,724 B2* | 11/2015 | Sakota | B64C 9/22 |
| 10,259,566 B1* | 4/2019 | Lawrence | B64C 23/06 |
| 10,618,644 B2* | 4/2020 | Gemilang | B64C 13/30 |
| 2001/0038058 A1* | 11/2001 | Gleine | B64C 3/46 |
| | | | 244/198 |
| 2002/0005461 A1* | 1/2002 | Nettle | B64C 3/48 |
| | | | 244/214 |
| 2002/0195527 A1* | 12/2002 | Broadbent | B64C 9/26 |
| | | | 244/214 |
| 2003/0226936 A1* | 12/2003 | Mau | B64C 9/24 |
| | | | 244/214 |
| 2005/0040294 A1* | 2/2005 | Perez-Sanchez | B64C 9/16 |
| | | | 244/215 |
| 2005/0178925 A1* | 8/2005 | Broadbent | B64C 9/22 |
| | | | 244/214 |
| 2006/0038088 A1* | 2/2006 | Dodson | B64C 9/22 |
| | | | 244/214 |
| 2006/0169847 A1* | 8/2006 | Konings | B64C 3/50 |
| | | | 244/214 |
| 2006/0202089 A1* | 9/2006 | Reckzeh | B64C 9/20 |
| | | | 244/215 |
| 2007/0034746 A1* | 2/2007 | Shmilovich | B64C 9/16 |
| | | | 244/207 |
| 2007/0034747 A1* | 2/2007 | Amorosi | B64C 9/22 |
| | | | 244/215 |
| 2007/0252040 A1* | 11/2007 | Kordel | B64C 7/00 |
| | | | 244/123.1 |
| 2008/0265089 A1* | 10/2008 | Zeumer | B64C 9/16 |
| | | | 244/99.3 |
| 2008/0265102 A1* | 10/2008 | Larssen | B64C 7/00 |
| | | | 244/203 |
| 2009/0001224 A1* | 1/2009 | Perez-Sanchez | B64C 9/22 |
| | | | 244/214 |
| 2009/0072093 A1* | 3/2009 | Fox | B64C 9/22 |
| | | | 244/214 |
| 2010/0155542 A1* | 6/2010 | Heller | B64C 3/50 |
| | | | 244/214 |
| 2010/0187368 A1* | 7/2010 | Cathelain | B64C 9/24 |
| | | | 244/214 |
| 2010/0327111 A1* | 12/2010 | Sanderson | B64C 9/22 |
| | | | 244/99.3 |
| 2011/0006155 A1* | 1/2011 | Kracke | B64C 9/02 |
| | | | 244/99.3 |
| 2011/0101174 A1* | 5/2011 | Voss | B64C 9/16 |
| | | | 244/213 |
| 2011/0127386 A1* | 6/2011 | Morris | B64C 9/26 |
| | | | 244/216 |
| 2012/0241564 A1* | 9/2012 | Parker | B64C 9/22 |
| | | | 244/214 |
| 2013/0009015 A1* | 1/2013 | Golling | B64C 21/04 |
| | | | 244/203 |
| 2013/0119194 A1* | 5/2013 | Dostmann | B64C 9/16 |
| | | | 244/99.3 |
| 2013/0334364 A1* | 12/2013 | Parker | B64C 9/22 |
| | | | 244/99.3 |
| 2014/0138481 A1* | 5/2014 | Sakota | B64C 9/24 |
| | | | 244/99.3 |
| 2014/0339358 A1* | 11/2014 | Swartley | H01R 41/00 |
| | | | 244/99.3 |
| 2017/0320566 A1* | 11/2017 | Gemilang | B64C 9/26 |
| 2018/0086432 A1* | 3/2018 | Schlipf | B64C 3/50 |
| 2018/0141637 A1* | 5/2018 | Schlipf | B64C 9/22 |
| 2018/0178900 A1* | 6/2018 | Lorenz | B64C 9/22 |
| 2018/0312244 A1* | 11/2018 | Bensmann | B64C 13/28 |

FOREIGN PATENT DOCUMENTS

| | | |
|---|---|---|
| FR | 1395340 | 4/1965 |
| GB | 998895 | 7/1965 |

* cited by examiner

WING FOR AN AIRCRAFT

CROSS-REFERENCES TO RELATED APPLICATIONS

This application claims the benefit of the European patent application No. 16206500.7 filed on Dec. 22, 2016, the entire disclosures of which are incorporated herein by way of reference.

BACKGROUND OF THE INVENTION

The present invention relates to a wing for an aircraft, comprising a main wing, a slat and a connection assembly for movably connecting the slat to the main wing, such that the slat can be moved relative to the main wing between a retracted position for cruise flight and at least one extended position, preferably two or more extended positions for takeoff and landing.

The connection assembly comprises an elongate slat track which extends along a track longitudinal axis in a curved or straight manner The slat track is mounted to the main wing in such a way that it is movable in the direction of the track longitudinal axis along a predetermined path. The predetermined path is usually defined by rollers which are mounted to the main wing and which engage the surface of the slat track on opposite sides, so that the slat track is guided by the rollers. The path extends as an extension of the slat track along the track longitudinal axis. Further, the slat track is connected to the slat, preferably at a first track end, wherein the connection might be directly or indirectly via further parts.

Such wings employing a slat track to movably mount the slat to the main wing are long known in the prior art. The slat is usually fixedly connected to the first track end of the slat track, so that the movement of the slat is defined alone by the movement of the slat track along the predetermined path. In order to achieve a curved movement path of the slat when the slat is moved between the retracted position and the extended position along the leading edge of the main wing, it is necessary that the slat track has a curved shape and, thus, moves on a curved path, when viewed in a cross-section across the wingspan direction. Such a curved slat track and movement path of the slat track require considerable room in the leading edge portion of the main wing, so that a front spar of the main wing usually has to be penetrated by the slat track when the slat track is in the retracted position. In order to allow the slat track to penetrate the front spar, special construction, called a track can, has to be provided in the front spar which is formed to receive the slat track in the retracted position in order to seal the area behind the front spar, which is often used as a fuel tank, from the leading edge portion of the main wing where the slat track is mounted. Such a construction of the wing with a penetrated front spar, and a track can, is usually complex.

SUMMARY OF THE INVENTION

Accordingly, an object of the present invention is to provide a wing for an aircraft including a more compact connection assembly that does not require the front spar to the penetrated.

This object is achieved in that the slat track is connected to the slat in a rotatable, in particular pivotable, manner via a first hinge, preferably at the first track end. Further, the connection assembly comprises a link element which is rotatably, in particular pivotably, connected to the slat via a second hinge, preferably at its first link end. The link element is preferably formed as a rotating arm and can be connected to the slat directly or indirectly via further parts. The link element is, further, rotatably, in particular pivotably, mounted to the main wing via a third hinge spaced apart from the second hinge, preferably at its second link end opposite the first link end. A first axis of rotation of the first hinge is spaced apart from a second axis of rotation of the second hinge, when viewed in a cross-section across a wingspan direction of the wing. Preferably, the slat track and the link element are arranged spaced apart in the wingspan direction by a certain amount. However, they might also be arranged in the same wingspan layer. The first, second and/or third hinge might be formed to allow pivoting movement only about a single axis. However, they might also be formed as universal joints or as spherical joints allowing pivoting movement about more than a single axis, in particular about two perpendicular axes, in order to reduce inherent stress. Also, each of the first, second and third hinges might be formed by two universal joints or spherical joints which are spaced apart in the wingspan direction, thereby allowing pivoting movement about an axis formed by a straight connection line between the two universal or spherical joints.

In such a way, the entire connection assembly might be arranged in front of the front spar of the main wing, so that the front spar does not need to be penetrated by the slat track and a track can is not required. This, in turn, saves construction and maintenance effort and, thus, saves costs.

According to a preferred embodiment, the first axis of rotation is parallel to the second axis of rotation, and preferably, also to a third axis of rotation of the third hinge. Preferably, the first axis of rotation and the second axis of rotation extend in the wingspan direction. Further preferably, also the third axis of rotation extends in the wingspan direction. In such a way, a space saving arrangement of the connection assembly is provided.

According to another preferred embodiment, the slat track has a straight form along its longitudinal extension, i.e., along the track longitudinal axis, at least within a region in which the slat track is guided at the main wing, so that the first hinge moves along a straight line when the slat track is moved relative to the main wing between the retracted and the extended position. By such a straight form of the slat track and, thus, of the path along which the slat track moves, a space saving design of the connection assembly is possible, thereby allowing the arrangement of the connection assembly entirely in front of the front spar, so that the front spar does not need to be penetrated and no track can is necessary. However, it is also possible that the slat track has a curved or bent form along the track longitudinal axis, so that the first hinge moves on a curved line when the slat track is moved relative to the main wing between the retracted and the extended position.

According to yet another preferred embodiment, the first hinge and/or the second hinge is mounted directly to the slat. In such a way, the first axis of rotation and/or the second axis of rotation extend close to the surface of the slat and a compact construction is possible.

According to a preferred alternative embodiment, the first hinge is connected to the slat via a first connection element that is fixedly, i.e., rigidly, mounted to the slat. Alternatively or additionally, it is preferred that the second hinge is connected to the slat via a second connection element that is fixedly, i.e., rigidly, mounted to the slat. By such first and second connection elements, in particular by their length and position at the slat, the path on which the slat is moved between the retracted and the extended position can be defined as desired.

In particular, it is preferred that the first connection element is formed as a first bar and/or the second connection element is formed as a second bar. The first bar and the second bar represent simple and lightweight connection elements for connecting the first hinge and the second hinge to the slat in a spaced manner, so that a certain path of movement of the slat can be defined.

In a preferred embodiment of the present invention, the connection assembly is arranged such that in the retracted position of the slat, the second hinge is located above the third hinge, with respect to a normal position of the wing of an aircraft on the ground. In such a way, when the slat is moved to the extended position, the second hinge moves downwards. Alternatively, it is preferred that the connection assembly is arranged in such a manner that in the retracted position of the slat, the second hinge is located below the third hinge with respect to a normal position of the wing of an aircraft on the ground. In such a way, when the slat is moved to the extended position, the second hinge moves upwards. Which one of the two before described arrangements of the connection assembly is chosen, depends on how the desired form of the path of movement of the slat between the retracted position and the extended position is to be defined.

In yet another preferred embodiment, the connection assembly further comprises a drive unit for initiating movement of the slat relative to the main wing between the retracted and the extended position.

In particular, it is preferred that the drive unit comprises a drive pinion engaging the slat track, so as to drive the slat track along its guided path, i.e., along the rollers. The slat track preferably comprises a toothed rack at one of its side surfaces which is engaged by the drive pinion. By such a drive pinion engaging the slat track, a drive is provided that does not require a lot of space.

Alternatively or additionally, it is preferred that the drive unit comprises a rotary actuator driving the link element about a third axis of rotation of the third hinge. In such a way, the link element is formed as a rotary drive arm which represents a simple, effective and space-saving drive concept.

Alternatively or additionally, it is preferred that the drive unit comprises a driven coupling bar coupling the slat to the main wing in a position spaced apart from the slat track and/or from the link element in a wingspan direction. Preferably, the coupling bar is rotatably coupled to the slat at its first end and is connected to or engaged by a linear actuator that is mounted, preferably rotatably mounted, to the main wing. The linear actuator can be, for example, in the form of a drive pinion, a hydraulic cylinder or an electromagnetic linear motor. Alternatively, the coupling bar is rotatably coupled to the slat at its first end and is rotatably connected to a rotary drive arm at its opposite second end, wherein the drive arm is rotatingly driven mounted to the main wing. In such a way, the drive unit does not need to be arranged in the same wingspan layer as the slat track and/or the link element, thereby allowing for a more compact and space-saving design of the slat track and the link element.

According to yet another preferred embodiment, the main wing comprises a front spar facing the leading edge portion of the main wing, for integrally supporting the main wing. Preferably, the slat track, even in the retracted position, is arranged entirely in front of the front spar, i.e., on that side of the front spar facing the slat, without penetrating the front spar. In such a way, no track can is required and a simpler design of the wing is enabled.

According to another preferred embodiment of the present invention, the connection assembly is a first connection assembly. Further, a second connection assembly is provided connecting the slat to the main wing in a position spaced apart from the first connection assembly in the wingspan direction. Preferably, the second connection assembly is formed as the first connection assembly, i.e., including the same features as the first connection assembly, in particular, a slat track and a link element connected to the slat and to the main wing as described before in connection with any of the preceding embodiments. In such a way, the slat is held to the main wing by at least two connection assemblies which are spaced from one another and which are formed in the same way, thereby allowing for a more compact design and to omit the track can on both connection assemblies. Alternatively, it might also be preferred that the second connection assembly is formed differently from the first connection assembly, for example when it is intended to avoid a track can only in one of the two positions.

A further aspect of the present invention relates to a connection assembly for movably connecting a slat to a main wing for an aircraft, as described before in connection with the wing for an aircraft. The connection assembly comprises an elongate slat track and a link element. The slat track is configured to be mounted to the main wing movably along a track longitudinal axis and is configured to be connected to the slat in a rotatable manner via a first hinge. The link element is configured to be rotatably connected to the slat via a second hinge and is configured to be rotatably mounted to the main wing via a third hinge spaced apart from the second hinge. The slat track and the link element are configured to be connected to the slat in such a way that a first axis of rotation of the first hinge is spaced apart from a second axis of rotation of the second hinge, when viewed in a cross-section across a wingspan direction.

The features, effects and advantages of the connection assembly as described further above in connection with the wing for an aircraft, also apply to the present connection assembly.

BRIEF DESCRIPTION OF THE DRAWINGS

Preferred embodiments of the present invention are described hereinafter in more detail in connection with a drawing. The drawing shows in FIG. 1, a schematic cross-sectional view across the wingspan direction of a first embodiment of the wing for an aircraft according to the present invention, FIG. 2, a schematic cross-sectional view of a second embodiment of the wing for an aircraft according to the present invention, FIG. 3, a schematic cross-sectional view of a third embodiment of the wing for an aircraft according to the present invention, FIG. 4, a schematic cross-sectional view of a fourth embodiment of the wing for an aircraft, wherein the slat is in the retracted position, FIG. 5, the wing of FIG. 4, wherein the slat is in a partly extended position, FIG. 6, the wing of FIG. 4, wherein the slat is in a fully extended position, FIG. 7, a schematic cross-sectional view of a drive unit to be employed in the wing of FIGS. 4-6, including a linear actuator in the form of a hydraulic cylinder, FIG. 8, a schematic cross-sectional view of an alternative drive unit to be employed in the wing of FIGS. 4-6, including a linear actuator in the form of a drive pinion, FIG. 9, a schematic cross-sectional view of a drive unit to be employed in the wing of FIGS. 4-6, including a rotary drive arm, and FIG. 10, a schematic top view of an embodiments of the wing according to the invention, wherein the slat is connected to the main wing by a first connection assembly and a second connection assembly.

DETAILED DESCRIPTION OF THE PREFERRED EMBODIMENTS

Figure 1:
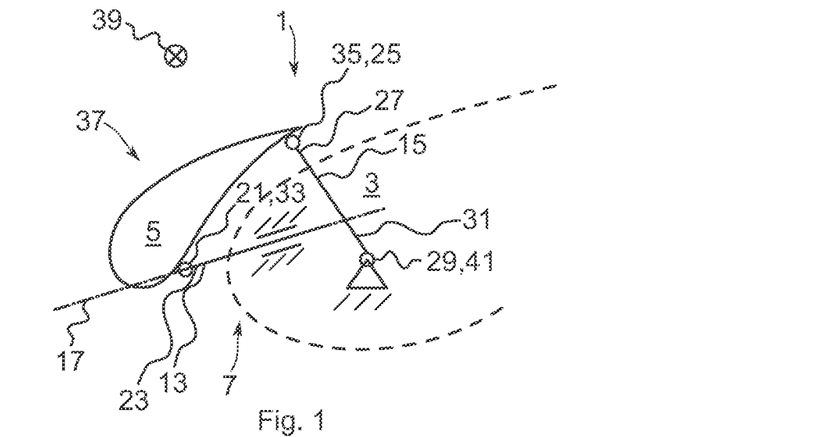
Figure 4:
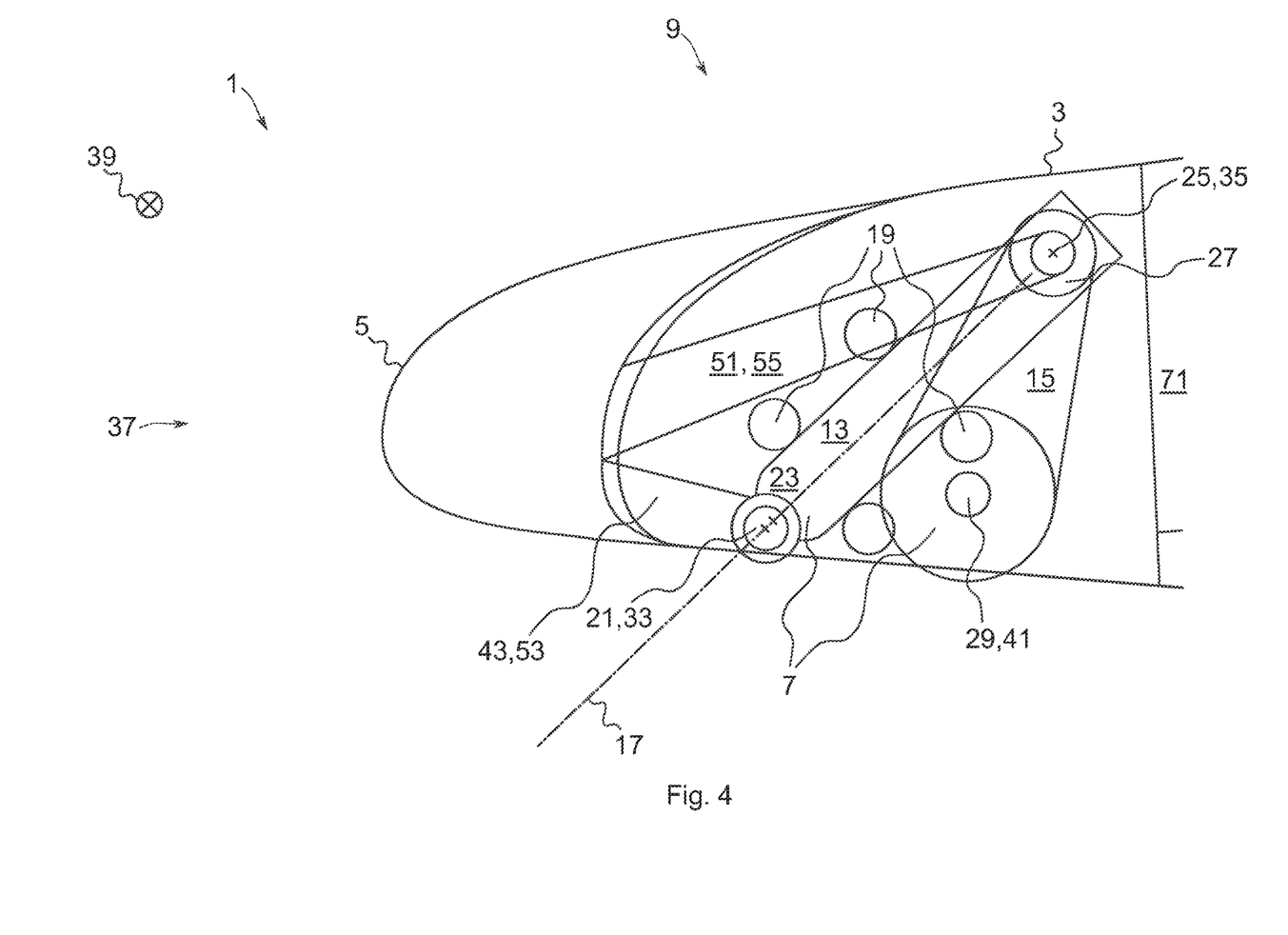
Figure 5:
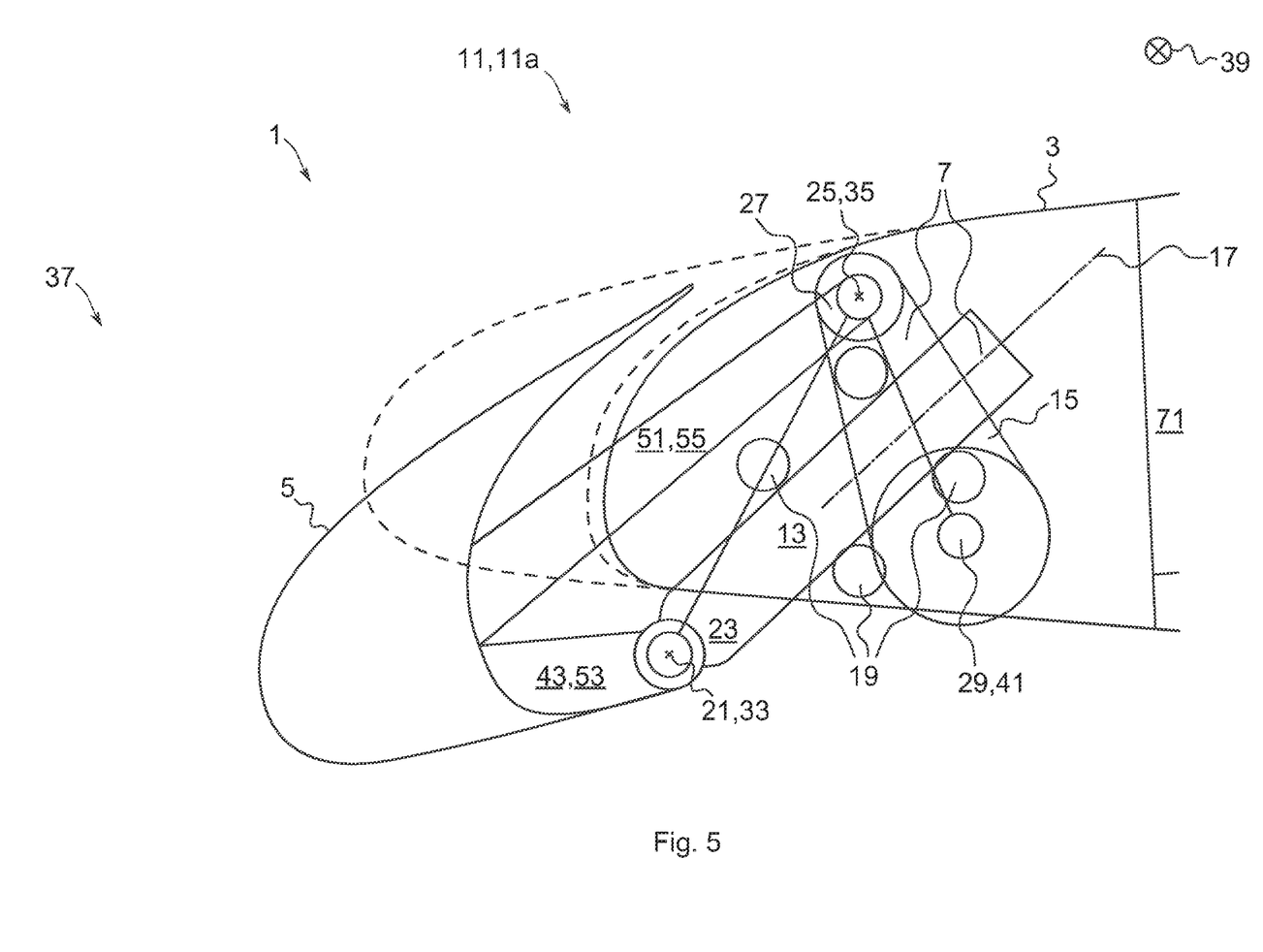
Figure 6:
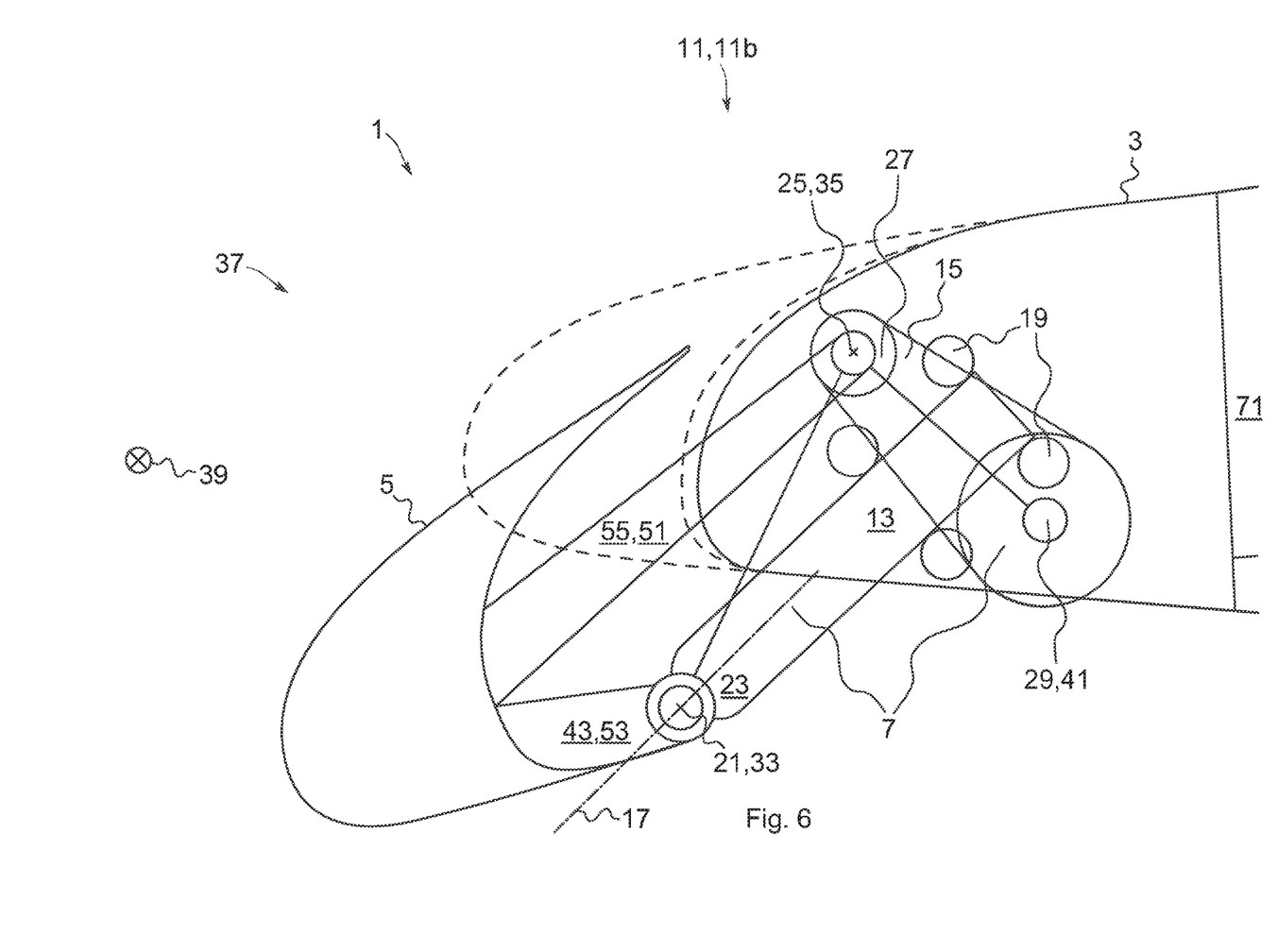

FIG. 1 shows a first embodiment of a wing 1 for an aircraft according to the present invention. The wing 1 comprises a main wing 3, a slat 5 and a connection assembly 7 for movably connecting the slat 5 to the main wing 3, such that the slat 5 can be moved relative to the main wing 3 between a retracted position 9 and an extended position 11. The connection assembly 7 comprises a slat track 13 and a link element 15. The slat track 13 has an elongate form and extends along a track longitudinal axis 17. The slat track 13 is mounted to the main wing 3 movably in the direction of the track longitudinal axis 17 along a path formed by rollers 19 guiding the slat track 13 from opposite sides, as it is illustrated in FIGS. 4 to 6. Further, the slat track 13 is connected to the slat 5 in a rotatable manner via a first hinge 21 at the first track end 23. The link element 15 is rotatably connected to the slat 5 via a second hinge 25 at its first link end 27. Further, the link element 15 is rotatably mounted to the main wing 3 via a third hinge 29 spaced apart from the second hinge 25, at its second link end 31 opposite the first link end 27. A first axis of rotation 33 of the first hinge 21 is spaced apart from a second axis of rotation 35 of the second hinge 25, when viewed in a cross section 37 across a wingspan direction 39, as shown in FIGS. 1 to 6. Further, the slat track 13 and the link element 15 are spaced apart from one another in the wingspan direction 39 by such an amount that they can move without interfering each other. The first axis of rotation 33 is parallel to the second axis of rotation 35, and also to a third axis of rotation 41 of the third hinge 29. The first, second and third axes of rotation 31, 33, 41 extend in the wingspan direction 39. As shown in FIG. 1, the first hinge 21 and the second hinge 25 are mounted directly to the slat 5 in the first embodiment of the present invention.

Figure 2:
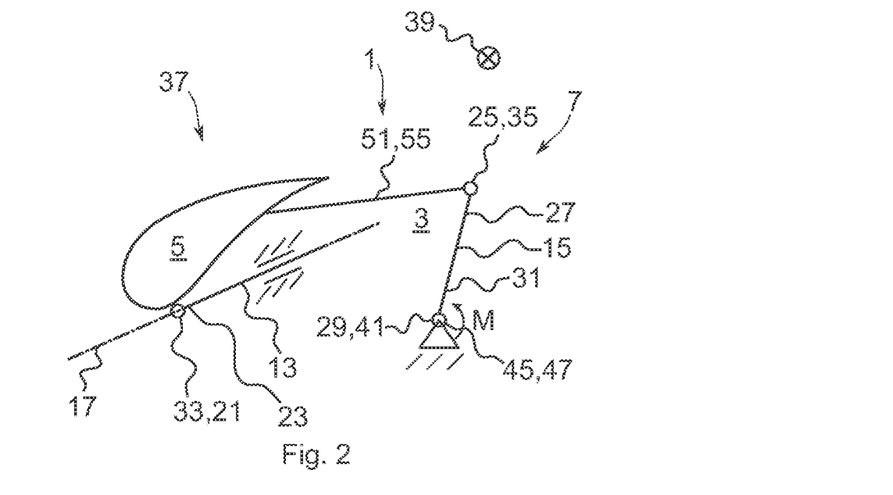

In FIG. 2, a second embodiment of the present invention is illustrated, which differs from the first embodiment shown in FIG. 1 by the second hinge 25 being connected to the slat 5 via a second connection element 51 that is fixedly mounted to the slat 5. In the second embodiment, in the retracted position 9 of the slat 5 the second hinge 25 is located above the third hinge 29 with respect to a normal position of the wing 1 of an aircraft on the ground. That means, when the slat 5 is moved to the extended position 11, the second hinge 25 moves downwards. Further, the connection assembly 7 of the second embodiment comprises a drive unit 45 for initiating movement of the slat 5 relative to the main wing 3 between the retracted position 9 and the extended position 11. The drive unit 45 comprises a rotary actuator 47 driving the link element 15 about the third axis of rotation 41 of the third hinge 29.

Figure 3:
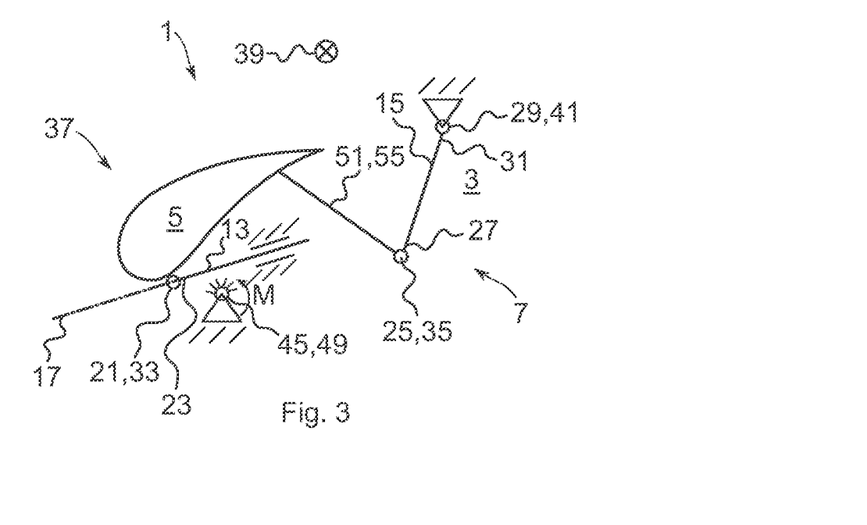

FIG. 3 shows a third embodiment of the present invention which differs from the second embodiment by the second hinge 25 in the retracted position 9 of the slat 5 being located below the third hinge 29 with respect to a normal position of the wing 1 of an aircraft on the ground. That means, when the slat 5 is moved to the extended position 11, the second hinge 25 moves upwards. The third embodiment further differs from the second embodiment by the drive unit 45 comprising a drive pinion 49 engaging the slat track 13 in order to drive the slat track 13 for movement along the track longitudinal axis 17.

In FIGS. 4 to 6, a fourth embodiment of the present invention is illustrated, which differs from the second embodiment in that, besides the second hinge 25 being connected to the slat 5 via a second connection element 51 that is fixedly mounted to the slat 5, also the first hinge 21 is connected to the slat 5 via a first connection element 43 that is fixedly mounted to the slat 5. The first connection element 43 is formed as a first bar 53 and the second connection element 51 is formed as a second bar 55. Further, the slat track 13 has a straight form along the track longitudinal axis 17, at least in the region in which the slat track 13 is guided at the main wing 3, so that the first hinge 21 moves along a straight line when the slat track 13 is moved relative to the main wing 3 between the retracted position 9 (see FIG. 4), a partly extended position 11*a* (see FIG. 5) and a fully extended position 11*b* (see FIG. 6). The slat track 13 is guided by rollers 19 on opposite sides of the slat track 13 forming a straight path of movement for the slat track 13. At the same time, when the slat 5 is moved from the retracted position 9 to the partly extended position 11*a* and further to the fully extended position 11*b,* the link element 15 pivots about the third axis of rotation 41 relative to the main wing 3 and guides the second hinge 25 including the second axis of rotation 35 along a circular path. Also, in contrast to the second embodiment, the fourth embodiment has a drive unit 45 comprising a driven coupling bar 57 coupling the slat 5 to the main wing 3 in a position spaced apart from the slat track 13 and from the link element 15 in the wingspan direction 39.

Figure 7:
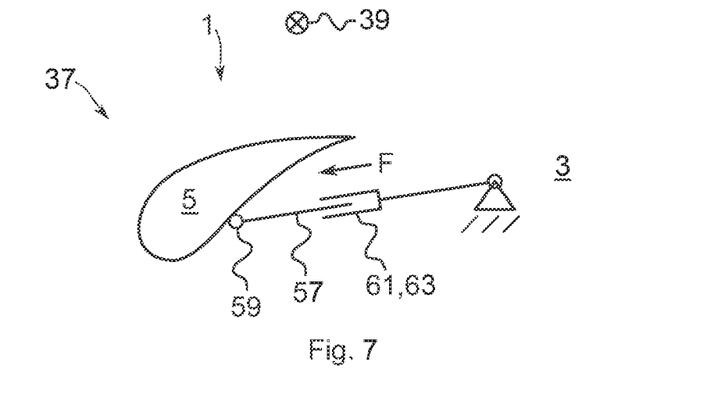
Figure 8:
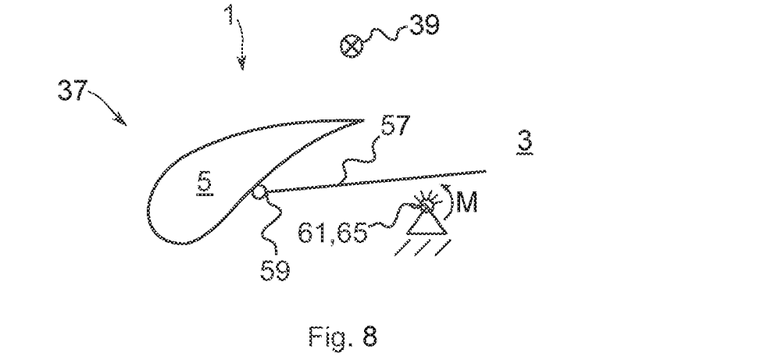
Figure 9:
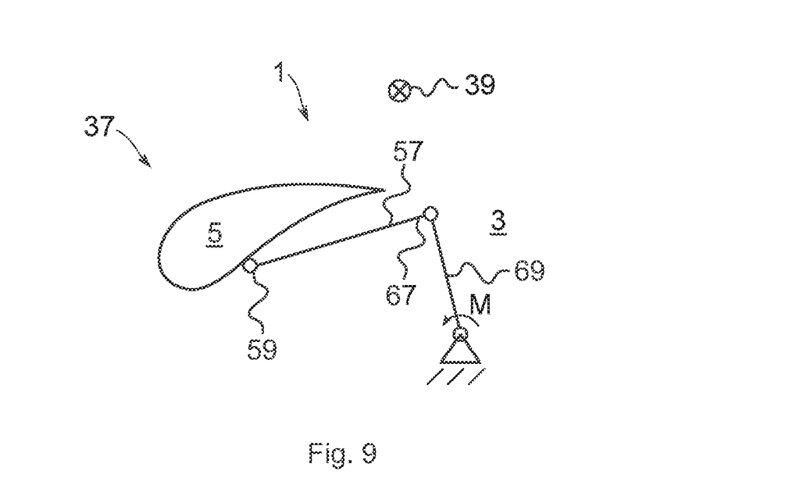

FIGS. 7 to 9 show three options of how the driven coupling bar 57 might be formed and arranged, in a cross-sectional view 37 across the wingspan direction 39. As shown in FIG. 7, the coupling bar 57 might be rotatably coupled to the slat 5 at its first end 59 and might be connected or engaged to a linear actuator 61 that is mounted to the main wing 3. FIG. 7 shows an option where the linear actuator 61 is formed as a hydraulic cylinder 63, while FIG. 8 shows another option where the linear actuator 61 is formed as a driven pinion 65. Alternatively, as shown in FIG. 9, the coupling bar 57 might also be rotatably coupled to the slat 5 at its first end 59, and at its opposite second end 67 rotatably connected to a rotary drive arm 69 that is rotatingly mounted to the main wing 3.

Figure 10:
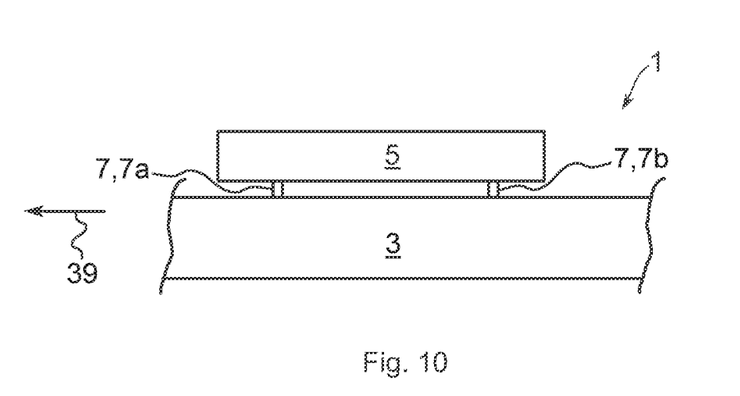

All described embodiments have in common that the connection assembly 7 is a first connection assembly 7*a* and that a second connection assembly 7*b* is provided connecting the slat 5 to the main wing 3 in a position spaced apart from the first connection element 7*a* in the wingspan direction 39, as illustrated in FIG. 10. In the preferred embodiments shown, the second connection assembly 7*b* is formed as the first connection assembly 7*a,* although it might also be formed differently from the first connection assembly 7*a.*

By the afore described embodiments of the wing 1 for an aircraft according to the present invention, in particular by the form of the connection assembly 7, a very compact construction of the connection assembly 7 is possible, so that the slat track 13, even in the retracted position 9, is arranged entirely in front of a front spar 71 of the main wing 3 without penetrating the front spar 71 (see FIGS. 4-6). In such a way, the construction of the wing 1 is considerably simplified.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing,
a slat, and
a connection assembly for movably connecting the slat to the main wing, such that the slat can be moved between a retracted position and at least one extended position, the connection assembly comprising an elongate slat track mounted to the main wing and connected to the slat, wherein the elongate slat track has a straight form and defines a track longitudinal axis that is fixed, wherein the elongate slat track moves along the track longitudinal axis
the elongate slat track being connected to the slat in a rotatable manner via a first hinge,
the connection assembly further comprising a link element rotatably connected to the slat via a second hinge, and rotatably mounted to the main wing via a third hinge spaced apart from the second hinge, and
a first axis of rotation of the first hinge is spaced apart from a second axis of rotation of the second hinge.

2. The wing according to claim 1, wherein the first axis of rotation is parallel to the second axis of rotation.

3. The wing according to claim 1, wherein in the retracted position the second axis of rotation is located rearward of a third axis of rotation of the third hinge, and in the extended position the second axis of rotation is forward of the third axis of rotation.

4. The wing according to claim 1, wherein at least one of the first hinge or the second hinge is mounted directly to the slat.

5. The wing according to claim 1, wherein in the retracted position of the slat, the second hinge is located above the third hinge.

6. The wing according to claim 1, wherein in the retracted position of the slat, the second hinge is located below the third hinge.

7. The wing according to claim 1, wherein the main wing comprises a front spar, and wherein the elongate slat track in the retracted position is arranged entirely in front of the front spar without penetrating the front spar.

8. The wing according to claim 1, wherein the connection assembly is one of a first connection assembly and a second connection assembly, wherein the second connection assembly is provided connecting the slat to the main wing in a position spaced apart from the first connection assembly in the wingspan direction.

9. The wing according to claim 1, wherein at least one of the first hinge being connected to the slat via a first connection element fixedly mounted to the slat, or wherein the second hinge being connected to the slat via a second connection element fixedly mounted to the slat.

10. The wing according to claim 9, wherein at least one of the first connection element being formed as a first bar or the second connection element being formed as a second bar.

11. The wing according to claim 1, wherein the connection assembly further comprises a drive unit for initiating movement of the slat between the retracted position and the extended position.

12. The wing according to claim 11, wherein the drive unit comprises a drive pinion engaging the elongate slat track.

13. The wing according to claim 11, wherein the drive unit comprises a rotary actuator driving the link element about a third axis of rotation of the third hinge.

14. The wing according to claim 11, wherein the drive unit comprises a driven coupling bar coupling the slat to the main wing in a position spaced apart from at least one of the elongate slat track or the link element in a wing span direction, wherein the coupling bar is rotatably coupled to the slat and is either connected to a linear actuator mounted to the main wing, or rotatably connected to a rotary drive arm mounted to the main wing.

15. A connection assembly for movably connecting a slat to a main wing for an aircraft, the connection assembly comprising:
an elongate slat track having a straight form defines a track longitudinal axis, the elongate slat track is configured to be fixedly mounted to the main wing movably along the track longitudinal axis, and configured to be connected to the slat
the elongate slat track being configured to be connected to the slat in a rotatable manner via a first hinge,
a link element configured to be rotatably connected to the slat via a second hinge, and configured to be rotatably mounted to the main wing via a third hinge spaced apart from the second hinge, and
the elongate slat track and the link element being configured to be connected to the slat such that a first axis of rotation of the first hinge is spaced apart from a second axis of rotation of the second hinge.

* * * * *